United States Patent
Balasubramanian et al.

(10) Patent No.: US 11,087,096 B2
(45) Date of Patent: Aug. 10, 2021

(54) METHOD AND SYSTEM FOR REDUCING INCIDENT ALERTS

(71) Applicant: Accenture Global Solutions Limited, Dublin (IE)

(72) Inventors: Ramkumar Balasubramanian, Bengalure (IN); Sandeep Bhutani, Mohali (IN); Chandrasekhar Pilla, Visakhapatnam (IN); Shallu Gupta, Delhi (IN); Sekhar Naga Venkata Maddula, Hyderabad (IN)

(73) Assignee: Accenture Global Solutions Limited, Dublin (IE)

( * ) Notice: Subject to any disclaimer, the term of this patent is extended or adjusted under 35 U.S.C. 154(b) by 291 days.

(21) Appl. No.: 16/291,426

(22) Filed: Mar. 4, 2019

(65) Prior Publication Data
US 2020/0285697 A1 Sep. 10, 2020

(51) Int. Cl.
*G06F 15/173* (2006.01)
*G06F 40/55* (2020.01)
(Continued)

(52) U.S. Cl.
CPC .............. *G06F 40/55* (2020.01); *G06F 11/00* (2013.01); *G06F 11/0703* (2013.01);
(Continued)

(58) Field of Classification Search
CPC ..... H04L 41/06; H04L 41/0604; G06F 40/55; G06F 40/205
See application file for complete search history.

(56) References Cited

U.S. PATENT DOCUMENTS 7,818,631 B1 * 10/2010 Halikhedkar ........ H04Q 3/0075
714/48
8,903,923 B2 * 12/2014 Pinel .................. G06Q 10/0631
709/206
(Continued)

OTHER PUBLICATIONS

"Community Detection and Correlated Attribute Cluster Analysis on Multi-Attributed Graphs", Ito et al., Graduate School of Systems and Information Engineering, University of Tsukuba, Center for Computational Sciences, University of Tsukuba, Mar. 28, 2018, 8pp.

(Continued)

*Primary Examiner* — Yves Dalencourt
(74) *Attorney, Agent, or Firm* — Plumsea Law Group, LLC

(57) ABSTRACT

A system and method for reducing incident alerts for an enterprise environment are described. In one embodiment, a method of reducing incident alerts for an enterprise environment includes receiving a plurality of historical incident alerts associated with previous incidents associated with nodes within an enterprise environment. The method includes extracting from a first subset of the historical incident alerts a plurality of rules to generate a rule knowledge base and analyzing a second subset of the historical incident alerts against the plurality of rules to identify candidate incidents alerts as potential dead-end tickets. The method also includes providing feedback on the candidate incident alerts to confirm or deny that the alert is a dead-end ticket. Based on the feedback, a prescriptive avoidance rule set is generated to identify an incident alert as a dead-end ticket and eliminate the dead-end tickets from submitted incident alerts.

20 Claims, 8 Drawing Sheets

(51) Int. Cl.
*G06F 16/35* (2019.01)
*G06Q 10/10* (2012.01)
*G06F 40/205* (2020.01)
*H04L 12/24* (2006.01)
*G06F 11/00* (2006.01)
*G06F 11/07* (2006.01)

(52) U.S. Cl.
CPC .......... *G06F 16/355* (2019.01); *G06F 40/205* (2020.01); *G06Q 10/107* (2013.01); *H04L 41/06* (2013.01); *H04L 41/0604* (2013.01)

(56) References Cited

U.S. PATENT DOCUMENTS

| | | | |
|---|---|---|---|
| 9,317,829 | B2 | 4/2016 | Anand et al. |
| 2003/0221123 | A1* | 11/2003 | Beavers .............. H04L 63/1416 726/23 |
| 2014/0259170 | A1 | 9/2014 | Amsler |
| 2016/0196501 | A1* | 7/2016 | Anand .................. G06F 11/079 706/46 |
| 2018/0150758 | A1 | 5/2018 | Niininen |

OTHER PUBLICATIONS

"Exploiting Natural Language Processing for Analysing Railway Incident Reports", Sydea et al., Department of Entrepreneurship, Strategy & Innovation, Lancaster University, Management School, Lancaster University, LA1 4YX, UK, Jan. 2018, 18pp.

"Learning-based Rule-Extraction from Support Vector Machines", Barakat et al., Faculty of Applied Sciences 1 Natural Language Processing and Machine Learning Group Sohar University Sohar, PC311, Oman, Sep. 28, 2004, 8pp.

Examination report dated Jan. 28, 2021 for Australian Patent Application No. 2020200629.

* cited by examiner

US 11,087,096 B2

METHOD AND SYSTEM FOR REDUCING INCIDENT ALERTS

TECHNICAL FIELD

The present disclosure generally relates to information technology incident alert systems. More specifically, the present disclosure generally relates to a system and method for reducing incident alerts in an enterprise environment.

BACKGROUND

Enterprise networks are currently undergoing a digital transformation. Based on business requirements and performance metrics, enterprise networks typically choose a hybrid infrastructure topology. Every network element or node in the enterprise environment is connected to different other network elements or nodes. One incident can lead to multiple other incidents within the same domain or across different connected domains in the environment.

A typical challenge in enterprise environments is incident alerts that consume time and resources from information technology incident alert system personnel but which are not themselves resolvable. Approximately 20% of submitted incident alerts are false positives that lead to illusionary work where a solution does not exist. These false positives waste incident alert system personnel effort to close unnecessary incident alerts. Additionally, many enterprise networks do not have a clear picture of the actual incident alert landscape within the enterprise environments.

Identifying incident alerts which should not be generated is a complicated process because alerts can be generated due to many reasons in the incident management process. For example, unnecessary incident alerts may be generated because of inefficient correlation rules, blackouts not being configured during planned outages, internode relationships not being properly maintained, and/or transition devices moved to production without proper configuration, among other reasons.

SUMMARY

Currently, algorithms which can identify a false positive incident alert are based on empirical knowledge of the enterprise environment. Each rule must be incorporated into the algorithm or the solution. These conventional solutions do not provide a dynamic technique capable of extracting all possible rules for identifying false positive incident alerts. Also, conventional solutions do not have rules that support cross domain false positives, like an incident alert during a backup process can cause multiple incidents in storage. These conventional solutions typically include a fixed set of rules and it is the responsibility of the network administrator or other incident alert system personnel to select the applicable rules based on their empirical knowledge of the enterprise environment. Any new causes of false positives can remain unnoticed both by the solution and incident alert system personnel, which can be time-consuming for incident alert system personnel to track and resolve.

Additionally, every domain can have different rules and new rules may need to be created based on particular business requirements. The potential landscape of an infrastructure environment can be very large. For example, in an environment with more than 50 interconnected domains, one incident alert caused by a source in one domain can lead to multiple incidents alerts in different domains. Because each enterprise environment is unique in its combination of domains, it will have different co-related internode connections. Accordingly, apart from empirical knowledge of the enterprise environment, there can also be many co-relation rules required to identify related incident alerts for a given infrastructure environment.

The example embodiments provide a system and method for reducing incident alerts for an enterprise environment which address these issues with the conventional techniques. The techniques presented herein generate a prescriptive rule engine which uses a prescriptive avoidance rule set to eliminate a portion of submitted incident alerts that consume time and resources from information technology incident alert system personnel but which are not themselves resolvable. In some embodiments, historical incident alert data is used to extract rules and classify incident alerts during a training phase, the extracted rules are improved using feedback during a reinforcement learning phase, and the improved rules are used to form a prescriptive avoidance rule set that is applied to submitted incident alerts within the enterprise environment during a client application phase. These techniques provide a mechanism to automatically eliminate unnecessary incident alerts from reaching incident alert system personnel, thereby allowing more efficient use of incident alert system resources.

In one aspect, the invention provides a method of reducing incident alerts for an enterprise environment, the method comprising: receiving a plurality of historical incident alerts associated with previous incidents associated with nodes within an enterprise environment; extracting from a first subset of the plurality of historical incident alerts a plurality of rules to generate a rule knowledge base for the enterprise environment; analyzing a second subset of the plurality of historical incident alerts against the plurality of rules in the rule knowledge base to identify one or more candidate incidents alerts as potential dead-end tickets; providing feedback on each of the one or more candidate incident alerts to confirm or deny that the candidate incident alert is a dead-end ticket; based on the provided feedback, generating a prescriptive avoidance rule set including one or more rules of the plurality of rules from the rule knowledge base that are configured to identify an incident alert as a dead-end ticket; and wherein the prescriptive avoidance rule set is configured to eliminate one or more dead-end tickets from a plurality of submitted incident alerts generated within the enterprise environment.

In another aspect, a system for reducing incident alerts for an enterprise environment is provided, the system comprising: at least one interface configured to receive data; a memory; and a processor in communication with the at least one interface and the memory, wherein the processor is configured to: receive a plurality of historical incident alerts associated with previous incidents associated with nodes within an enterprise environment; extract from a first subset of the plurality of historical incident alerts a plurality of rules to generate a rule knowledge base for the enterprise environment; analyze a second subset of the plurality of historical incident alerts against the plurality of rules in the rule knowledge base to identify one or more candidate incidents alerts as potential dead-end tickets; provide feedback on each of the one or more candidate incident alerts to confirm or deny that the candidate incident alert is a dead-end ticket; based on the provided feedback, generate a prescriptive avoidance rule set including one or more rules of the plurality of rules from the rule knowledge base that are configured to identify an incident alert as a dead-end ticket; and wherein the prescriptive avoidance rule set is configured to eliminate one or more dead-end tickets from a plurality of submitted incident alerts generated within the enterprise environment.

In another aspect, one or more non-transitory computer readable storage media encoded with instructions are provided that, when executed by a processor of an incident alert reducing system, causes the processor to: receive a plurality of historical incident alerts associated with previous incidents associated with nodes within an enterprise environment; extract from a first subset of the plurality of historical incident alerts a plurality of rules to generate a rule knowledge base for the enterprise environment; analyze a second subset of the plurality of historical incident alerts against the plurality of rules in the rule knowledge base to identify one or more candidate incidents alerts as potential dead-end tickets; provide feedback on each of the one or more candidate incident alerts to confirm or deny that the candidate incident alert is a dead-end ticket; based on the provided feedback, generate a prescriptive avoidance rule set including one or more rules of the plurality of rules from the rule knowledge base that are configured to identify an incident alert as a dead-end ticket; and wherein the prescriptive avoidance rule set is configured to eliminate one or more dead-end tickets from a plurality of submitted incident alerts generated within the enterprise environment.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The present embodiments provide a system and method for reducing incident alerts for an enterprise environment.

The techniques presented herein generate a prescriptive rule engine which uses a prescriptive avoidance rule set to eliminate a portion of submitted incident alerts that consume time and resources from information technology incident alert system personnel but which are not themselves resolvable.

Figure 1:
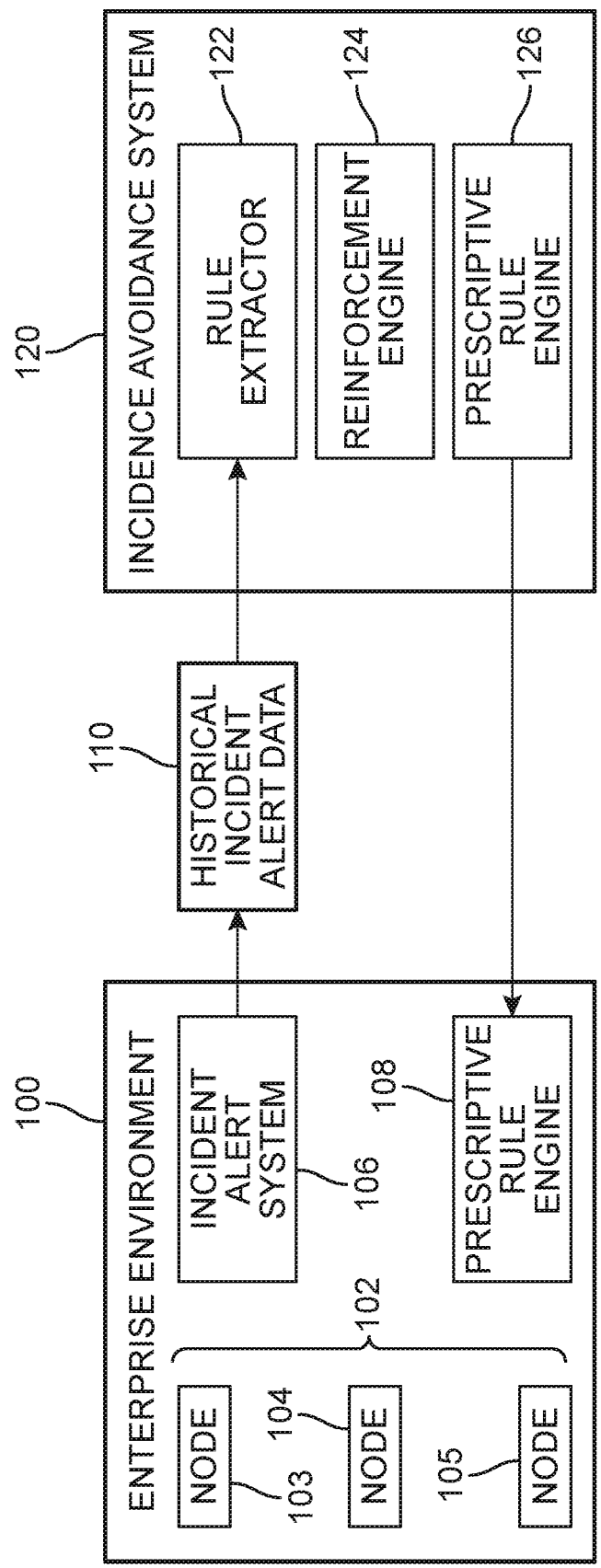
FIG. 1 is a schematic diagram of an example embodiment of a system for reducing incident alerts for an enterprise environment.

Referring now to FIG. 1, an embodiment of an incident avoidance system 120 for reducing incident alerts for an enterprise environment 100 is shown. In this embodiment, enterprise environment 100 is an enterprise network that includes a plurality of nodes or network elements 102, including at least a first node 103, a second node 104, and a third node 105. In an enterprise environment (e.g., enterprise environment 100), a node or network element is any application or device that receives, transmits, and/or processes data within the enterprise network. Examples of nodes or network elements may include routers, firewalls, servers, printers, bridges, gateways, user computers and devices, as well as appliances, modules, computing devices, or other components accessible through the enterprise network. While FIG. 1 illustrates three nodes 103, 104, 105 for purposes of discussion, it should be understood that in an enterprise environment hundreds or thousands of nodes may be present and may be spread across multiple domains within the same enterprise environment.

Enterprise environment 100 also includes an incident alert system 106. In some embodiments, incident alert system 106 may be an information technology help desk or other resource for assisting users and troubleshooting system, software, and/or hardware problems within the enterprise network. Additionally, in accordance with the techniques of the example embodiments described herein, enterprise environment 100 further includes a prescriptive rule engine 108 that includes a prescriptive avoidance rule set generated by incident avoidance system 120, as will be described in detail below.

In some embodiments, enterprise environment 100 may communicate with other computers or systems outside of the enterprise network, including incident avoidance system 120, over a communication network (not shown). The communication network may be any suitable wired or wireless communication network, including a wide area network (WAN) (e.g. the internet), local area network (LAN), or combination thereof.

In some embodiments, incident avoidance system 120 may include several modules configured to implement various operations associated with different phases of a method for reducing incident alerts for enterprise environment 100. The techniques of the example embodiments described herein are configured to reduce the number of submitted incident alerts that require action by personnel associated with incident alert system 106 by eliminating or reducing dead-end tickets. As used herein and in the claims, a "dead-end ticket" means an incident alert or ticket for which a problem has no actionable resolution or for which the resolution is dependent on the resolution of a different incident alert or ticket.

As shown in FIG. 1, incident avoidance system 120 includes a rule extractor module 122, a reinforcement engine module 124, and a prescriptive rule engine module 126. Rule extractor module 122 is configured to receive historical incident alert data 110 from enterprise environment 100 and extract a plurality of rules to generate a rules knowledge base. Historical incident alert data 110 may include various information associated with previous incident alerts for enterprise environment 100, including, but not limited to: ticket/incident number, a short description of the problem, an assignment group, a created/submitted date, a resolved date, an identification of a node or nodes, a parent incident alert reference, and notes regarding a resolution of the incident alert.

In an example embodiment, rule extractor module 122 generates or formulates the plurality of rules for the rules knowledge base using a first subset of historical incident alert data 110. In one embodiment, the first subset used to generate the plurality of rules is approximately 70% of historical incident alert data 110. The information associated with each incident alert in the first subset of historical incident alert data 110 is used to generate or formulate the plurality of rules by applying advanced pattern recognition techniques implemented by machine learning algorithms. Additionally, in some embodiments, rule extractor module 122 may also store and use rules extracted from other enterprise environments.

A second subset of historical incident alert data 110, which represents the remaining portion of historical incident alert data 110 excluding the first subset, may be used by incident avoidance system 120 for retraining and/or reinforcement learning techniques (e.g., implemented by reinforcement engine module 124). For example, in embodiments where the first subset is approximately 70% of historical incident alert data 110 used by rule extractor module 122 to generate the plurality of rules, the second subset is the approximately 30% remaining of historical incident alert data 110 that is available for retraining and/or reinforcement learning.

Reinforcement engine module 124 is configured to use a machine learning algorithm to implement advanced reinforcement learning by providing feedback to refine the plurality of rules extracted by rule extractor module 122. In one embodiment, reinforcement engine module 124 may use as an input the incident alert information for known dead-end tickets to compare the results with an output from the plurality of rules in the rules knowledge base extracted by rule extractor module 122. If the results match (i.e., rule extractor module 122 correctly identifies the dead-end ticket based on applying the information from the incident alert to the plurality of rules in the rules knowledge base), then positive feedback is provided. If, however, the results do not match (i.e., a known dead-end ticket is not identified by the plurality of rules in the rules knowledge base), then negative feedback is provided.

The positive and/or negative feedback obtained by reinforcement engine module 124 for each incident alert included in the second subset of historical incident alert data 110 may then be provided back to rule extractor module 122 to modify, adjust, and/or change one or more rules of the plurality of rules in the rules knowledge base.

In an example embodiment, prescriptive rule engine module 126 includes a prescriptive avoidance rule set that is generated based on the feedback from reinforcement module 124 and includes one or more rules of the plurality of rules from the rule knowledge base that are configured to identify an incident alert as a dead-end ticket. In some embodiments, rules included in the prescriptive avoidance rule set generated by prescriptive rule engine module 126 may be validated and/or modified to be specifically customized for the particulars of enterprise environment 100. This customized prescriptive avoidance rule set may then be provided as prescriptive rule engine 108 used within enterprise environment 100.

Figure 2:
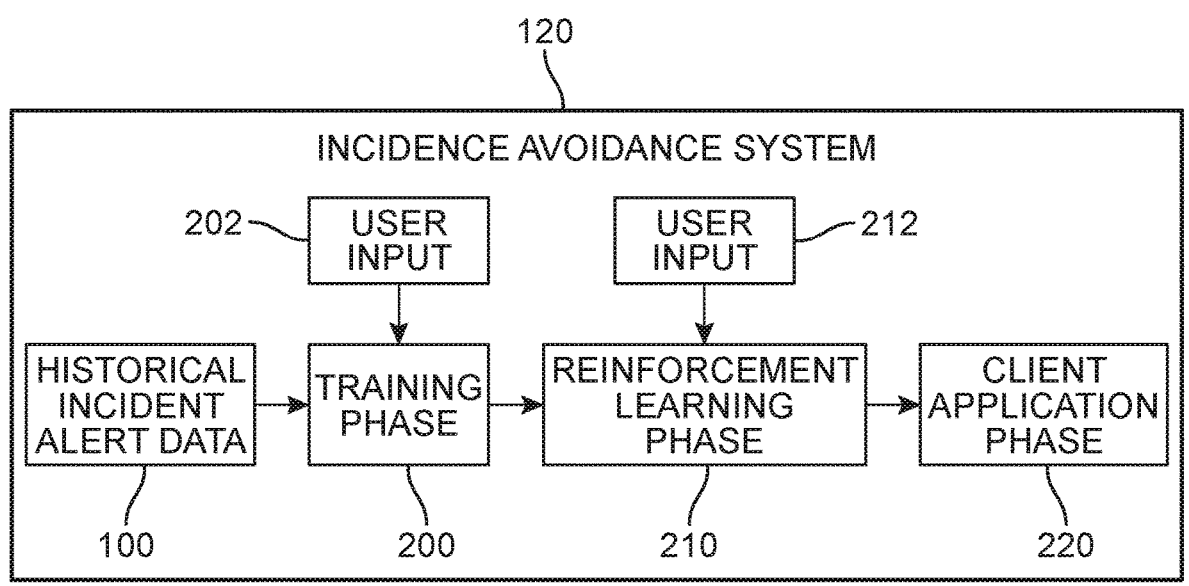
FIG. 2 is a schematic diagram of an example embodiment of an incident avoidance system.

Referring now to FIG. 2, a schematic diagram of an example embodiment of incident avoidance system 120 is shown. In this embodiment, a process of using historical incident alert data 110 by incident avoidance system 120 is illustrated. Initially, historical incident alert data 110 may be processed at incident avoidance system 120 during a training phase 200. For example, as described above, in some embodiments, a first subset of historical incident alert data 110 may be processed by rule extractor module 122 to generate or formulate the plurality of rules for the rules knowledge base during training phase 200. In some cases, user input 202 may be received during training phase 200 to assist rule extractor module 122 with extracting relevant rules for populating the rules knowledge base.

Next, after the rules knowledge base has been initially populated as part of training phase 200, incident avoidance system 120 may implement a reinforcement learning phase 210. Reinforcement learning phase 210 includes use of a machine learning algorithm that enables refinement and adjustment of the rules in the rules knowledge base through trial and error with feedback. For example, as described above, in some embodiments, a second subset of historical incident alert data 110 may be used by reinforcement engine module 124 to obtain positive and/or negative feedback on the rules in the rules knowledge base during reinforcement learning phase 210. In some cases, user input 212 may be received during reinforcement learning phase 210 to assist reinforcement engine module 124 with refining the rules in the rules knowledge base. User input 212 may be in the form of positive or negative feedback, as well as confirming or denying whether or not a particular incident alert is a dead-end ticket.

Upon completion of reinforcement learning phase 210, incident avoidance system 120 may implement a client application phase 220. Client application phase 220 includes generation of a prescriptive avoidance rule set for a prescriptive rule engine that is tailored or customized for a particular enterprise environment. For example, as described above, in some embodiments, a prescriptive avoidance rule set may be generated by prescriptive rule engine module 126 based on the feedback received during reinforcement learning phase 210. In some cases, prescriptive rule engine 108 used within enterprise environment 100 includes rules in the prescriptive avoidance rule set that have been validated and/or modified to be specifically customized for the particulars of enterprise environment 100.

With this arrangement, incident avoidance system 120 provides rules used by incident alert system 106 in enterprise environment 100 that are configured to identify an incident alert as a dead-end ticket. In this manner, a portion of the submitted incident alerts that are identified as dead-end tickets are eliminated to save time and resources of information technology incident alert system personnel.

Figure 3:
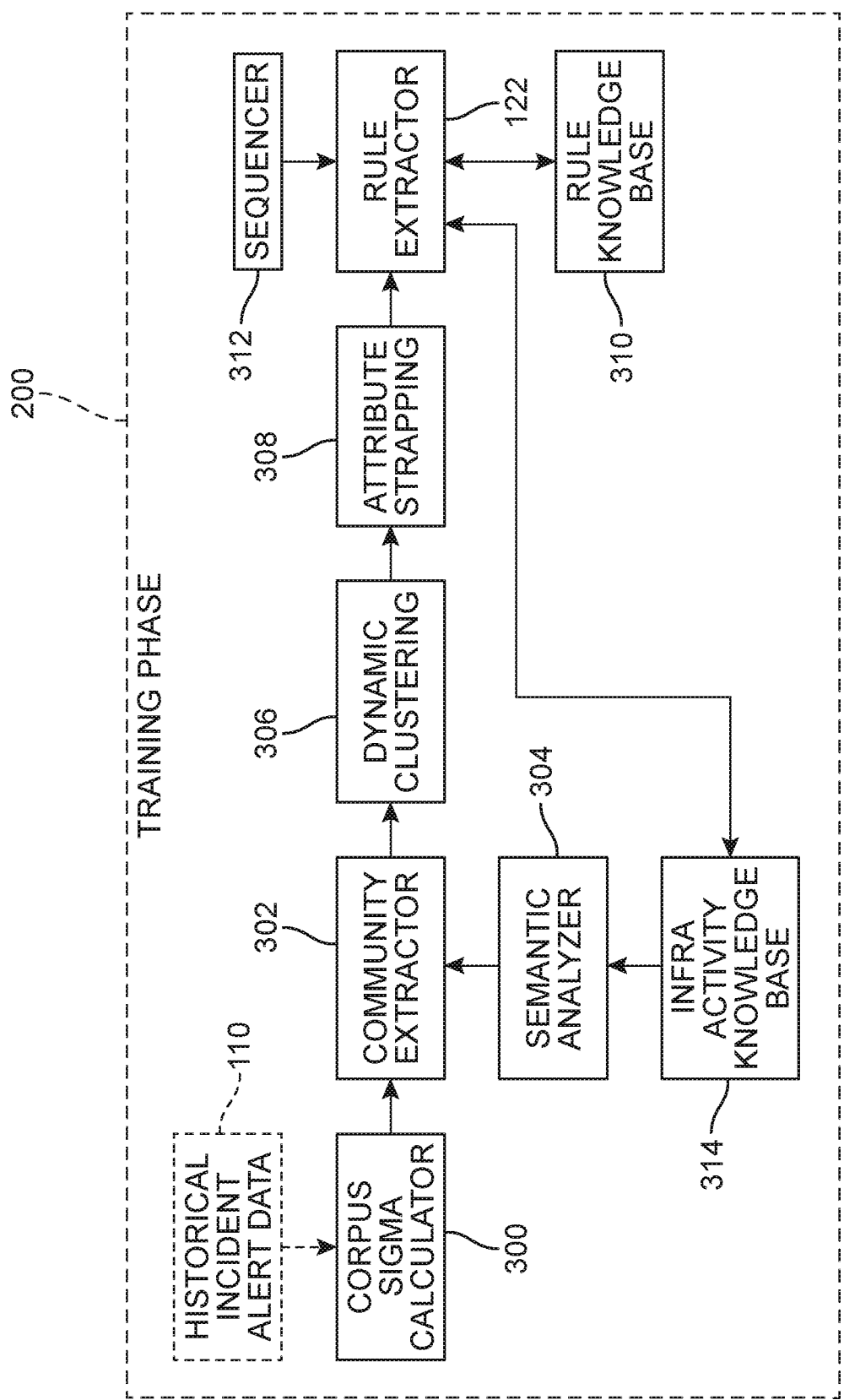
FIG. 3 is a schematic diagram of an example embodiment of a training phase of a method for reducing incident alerts.

Referring now FIG. 3, a schematic diagram of an example embodiment of training phase 200 is shown in greater detail. In some embodiments, multiple processes or modules may be included as part of training phase 200 implemented by incident avoidance system 120. In this embodiment, part of training phase 200 includes a corpus sigma calculator 300. At corpus sigma calculator 300, information associated with historical incident alert data 110 is converted into a text corpus and a word frequency is generated. The word frequencies may then be plotted in a normal distribution curve by corpus sigma calculator 300.

A group of incident alerts containing similar text and word frequency may form a community of related incident alerts. In one embodiment, similar historical incident alerts included in historical incident alert data 110 that share a word frequency within a predetermined threshold may form a community. In some embodiments, a number of communities present in the data is determined based on a sigma level (i.e., standard deviation) of the distribution curve. For example, in one embodiment, communities are chosen such that their total ticket distribution covers 2σ (95.4%) of the incident alerts or tickets available in historical incident alert data 110.

In an example embodiment, training phase 200 may further include a community extractor 302. In this embodiment, community extractor 302 uses the number of communities identified by corpus sigma calculator 300 and further extracts additional communities present in the data (e.g., from historical incident alert data 110). In some embodiments, community extractor 302 may receive input from a semantic analyzer 304, which assists community extractor 302 with identifying communities of incident alerts based on an analysis of the text corpus.

In some embodiments, semantic analyzer 304 may implement a distributional semantics algorithm used for natural language processing of the text corpus obtained from the information associated with historical incident alert data 110. In some cases, the text descriptions and other information in historical incident alert data 110 may be processed or cleaned to correct typographical errors, standardize spellings, etc., prior to analysis by semantic analyzer 304. In one embodiment, semantic analyzer 304 uses Latent Semantic Indexing (LSI) to analyze the relationships between a set of documents or texts and the terms they contain within, in this case, from historical incident alert data 110. Additionally, semantic analyzer 304 may also implement noise reduction techniques. For example, in one embodiment, semantic analyzer 304 uses Singular Vector Decomposition (SVD: $M=U\Sigma V^T$) for noise reduction while preserving the similarity structures.

In addition, in some embodiments, community extractor 302 may also determine an affinity score for each incident alert included in historical incident alert data 110 with respect to each of the determined communities. For example, if eight communities are determined by community extractor 302, an affinity score for each incident alert with respect to each of the eight communities may be determined. The determined affinity scores assist with correlating the relationships that exist between incident alerts and the determined communities.

In some embodiments, determining an affinity score may also include determining parent and child relationships between sources of incident alerts. An incident alert submitted for a child node or network element may be caused by a problem associated with a parent node or network element. For example, in an enterprise network, multiple incident alerts about problems with wireless network access submitted for different devices (i.e., child nodes) may be related to an incident alert about a problem with a wireless access point (i.e., parent node) serving those devices. In such cases, incident alerts for one or more child nodes are related to the incident alert for the parent node. As a result, a resolution of the problem associated with the incident alert for the parent node may be sufficient to resolve the problems detailed in the incident alerts for the child node or nodes. In some embodiments, determining a parent and child relationship between two or more nodes in the enterprise environment may be obtained by analyzing the relationships between the sources (i.e., nodes) included in the incident alerts in historical incident alert data 110. These parent-child relationships may then be used as part of the rules for the prescriptive avoidance rule set.

Dynamic clustering 306 may also be included as part of training phase 200. Based on the determined affinity scores, clusters of two or more communities may be generated. The clusters may be configured such that each incident alert included in historical incident alert data 110 is grouped into a cluster of communities. In addition to the affinity scores, dynamic clustering 306 may use information associated with the incident alerts from historical incident alert data 110, information associated with the determined communities from community extractor 302, and semantic scores associated with each community for generating the clusters.

For example, in an example embodiment, community detection may be determined by a greedy optimization of modularity scores, which range between −1 and 1. One such suitable greedy optimization technique is the Louvain method. Semantic similarity scores obtained from semantic analyzer 304 may be used for the modularity scores, which are to be optimized using the greedy optimization technique.

In some embodiments, training phase 200 may also include attribute strapping 308. In this embodiment, attribute strapping 308 includes attaching attributes obtained in the previous stages, including attributes from corpus sigma calculator 300, community extractor 302, semantic analyzer 304, and/or dynamic clustering 306, as well as additional attributes obtained from historical incident alert data 110 to each cluster. For example, attribute strapping 308 may include attaching information about time ranges, affinity score delta, number of sources (e.g., nodes or network elements), parent-child relationship factors, and/or resolution/close notes associated with incident alerts to each of the clusters obtained or generated by dynamic clustering 306.

In some embodiments, attribute strapping 308 may include determining a Z score for each of the clusters generated by dynamic clustering 306. Factors considered in determining each cluster's Z score include: σ of the similarity affinity scores, σ of time ranges, σ of resolution/close notes affinity scores, and Σ of Parent-Child relationship factor. For example, a Z score for a cluster i may be determined according to the following equation:

$$Z_i = \frac{x_i - \mu}{\sigma},$$

where x is the target value for which the Z score is being calculated, μ is the mean, and σ is the standard deviation.

For each cluster, a calculation may be made based on the product of the Z scores for: (a) ticket description affinity score, (b) clustered time ranges, and (c) closed notes affinity score, divided by the sum of the parent-child factor for the cluster according to the following equation:

$$\frac{Zi \text{ (Ticket Description affinity score)} \times Zi \text{ (Clustered Time Ranges)} \times Zi \text{ (Closed Notes affinity Score)}}{\sum \text{Parent-Child Factor of cluster}}$$

The resulting value for each cluster may then be used for attribute strapping 308. In an example embodiment, the calculation made according to the formula above may be referred to as a "dead-end ticket indicator". Generally, the chance of a candidate incident alert being a dead-end ticket is inversely proportional to its dead-end ticket indicator. That is, the lower the value or score, the higher probability or likelihood that a given candidate incident alert is a dead-end ticket. In addition, as applied on a cluster-level, the dead-end ticket indicator identifies the likelihood of a high number of dead-end tickets in a given cluster, where the lower the value or score for the cluster, the higher probability or likelihood that the cluster includes a higher number or proportion of candidate incident alerts that are dead-end tickets.

As previous described, training phase 200 includes rule extractor module 122, which is configured to generate or formulate the plurality of rules for a rules knowledge base 310. In accordance with the techniques of the present embodiments, the rules in rules knowledge base 310 are configured to eliminate dead-end tickets from submitted incident alerts. Some examples of rules which may be stored in rules knowledge base 310, include, but are not limited to:

Incident alert already exists: Check for the incident alert open and resolved dates. Find all incident alerts which are from the same source (e.g., node) and which have the exact same description and priority. If any incident alert open date is between the open and resolved date of the original incident alert, then it is a dead-end ticket and the incident alert needs to be captured or filtered. This rule is applied to raw data from submitted incident alerts.

Predefined pattern: Check for the incident alert creation date and time for that period. Find incident alerts from the same time during that period. Group all of the incident alerts fitting this criteria and if the occurrence is more than a pre-defined number, then it is a dead-end ticket and the incident alert needs to be captured or filtered.

Suppressed by Parent and Child relationship: Check the incident alert source (e.g., node). Find all the incident alerts where the source is available in the Parent source field. If it is available, then it is a dead-end ticket and the incident alert needs to be captured or filtered.

Flood of alerts: Check the date and time of the incident alert from the source (e.g., node). Group all of the incident alerts fitting this criteria and if the occurrence is more than a pre-defined number, then it is a dead-end ticket and the incident alert needs to be captured or filtered.

Suppressed by planned outage: Check all the incident alerts where classification is true based on the classifier result on planned activities on the closing notes of the incident alert. These are dead-end tickets and the incident alerts need to be captured or filtered.

Under Transition: Check all the incident alerts where classification is true based on the classifier result on transition device on the closing notes of the incident alert. These are dead-end tickets and the incident alerts need to be captured or filtered.

Missing alert: Check whether the incident alert has any source (e.g., node) information or not. If the incident alert has no source information, then then it is a dead-end ticket and the incident alert needs to be captured or filtered.

It should be understood that the above rules for rules knowledge base 310 are merely exemplary. In various embodiments, the number and type of rules may be different depending on the particulars of the enterprise environment and the information included in the historical incident alert data.

Referring again to FIG. 3, a sequencer 312 is configured to identify the relationship sequence between cause and effect for incident alerts to predict which incident alert has to be acted upon before another incident alert. For example, a single cause of a problem in the infrastructure space of an enterprise environment can lead to many effects and, therefore, many incident alerts. Sequencer 312 may use information associated with incident alerts, including, but not limited to: category, time, source of the incident, incident location, description, parent/child relationship, assignment groups, etc., to determine an order for acting upon incident alerts. In some embodiments, sequencer 312 may sequence the incident alerts using an algorithm for association rules mining based on statistical model goodness of fit measures, such as support, lift, confidence, length, actionability, and explicability.

In some embodiments, training phase 200 may also include accessing an infra activity knowledge base 314. Infra activity knowledge base 314 is a database that includes all possible activities by nodes and/or users in the infrastructure operations of enterprise environment 100. In some cases, infra activity knowledge base 314 may also include closure notes of pre-identified dead-end tickets. The information in infra activity knowledge base 314 may be used for analysis by rule extractor 122 and/or semantic analyzer 304.

Upon completion of training phase 200, rule extractor 122 has identified and generated or extracted a plurality of rules for rules knowledge base 310 that are configured to identify a dead-end ticket from a submitted incident alert. Next, reinforcement learning phase 210 is used to further refine the rules in rules knowledge base 310 to better identify whether or not an incident alert is a dead-end ticket.

Figure 4:
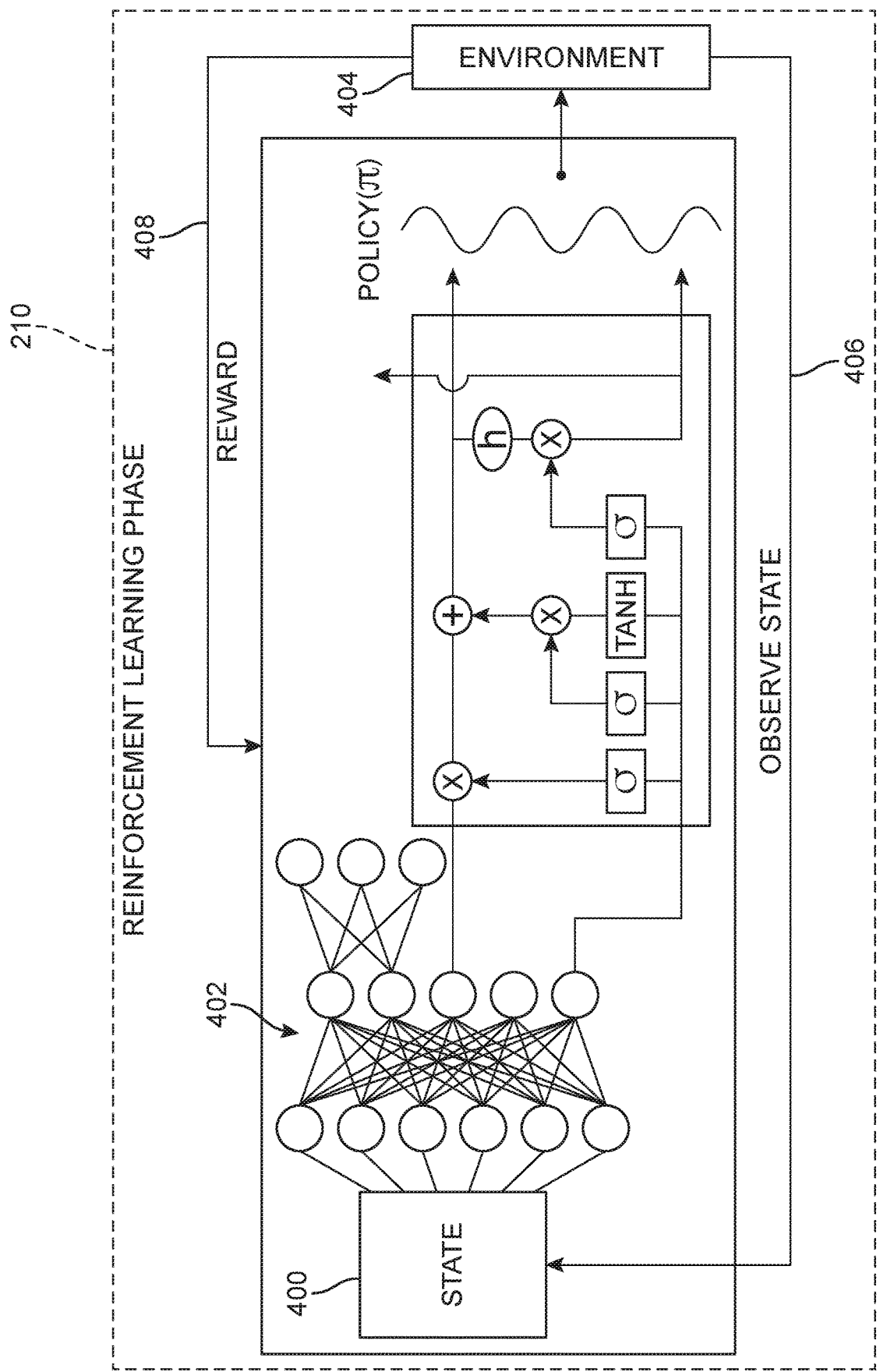
FIG. 4 is a schematic diagram of an example embodiment of a reinforcement learning phase of a method for reducing incident alerts.

Referring now to FIG. 4, a schematic diagram of an example embodiment of reinforcement learning phase 210 is shown in greater detail. In some embodiments, multiple processes or modules may be included as part of reinforcement learning phase 210 implemented by incident avoidance system 120. In this embodiment, a neural network 402 may be used to refine the rules in rules knowledge base 310 to better reach a classification of a candidate incident alert as a dead-end ticket or an actual incident alert.

As shown in FIG. 4, reinforcement learning phase 210 may include determining an initial state 400 based on information obtained from historical incident alert data 110. For example, as described above, a first subset of the historical incident alert data 110 may be used during training phase 200 and a second subset of the remaining historical incident alert data 110 may be used during this reinforcement learning phase 210.

Next, reinforcement learning phase 210 includes neural network 402 analyzing the second subset of the plurality of historical incident alerts against the plurality of rules in rule knowledge base 310 to identify one or more candidate incidents alerts as potential dead-end tickets. As shown in FIG. 4, the candidate incident alerts are applied to environment 404 (e.g., enterprise environment 100). Once neural network 402 has classified the candidate incident alerts as being potential dead-end tickets or actual incident alerts, the actual resolution for the information provided as in input to state 400 may be determined by observed state 406. That is, because historical incident alert data 110 is used during reinforcement learning phase 210, whether or not a candidate incident alert was a dead-end ticket or an actual incident alert is known, for example, based on the resolve/closed notes associated with each incident alert in historical incident alert data 110.

During reinforcement learning phase 210, feedback is provided on each of the one or more candidate incident alerts to confirm or deny that the candidate incident alert is a dead-end ticket. As shown in FIG. 4, positive feedback may be applied as a reward 408 during reinforcement learning phase 210 to neural network 402 in cases where a candidate incident alert was correctly identified as a dead-end ticket. Similarly, a punishment or negative feedback may also be applied to neural network 402 in cases where a candidate incident alert was not correctly identified as a dead-end ticket.

Figure 5:
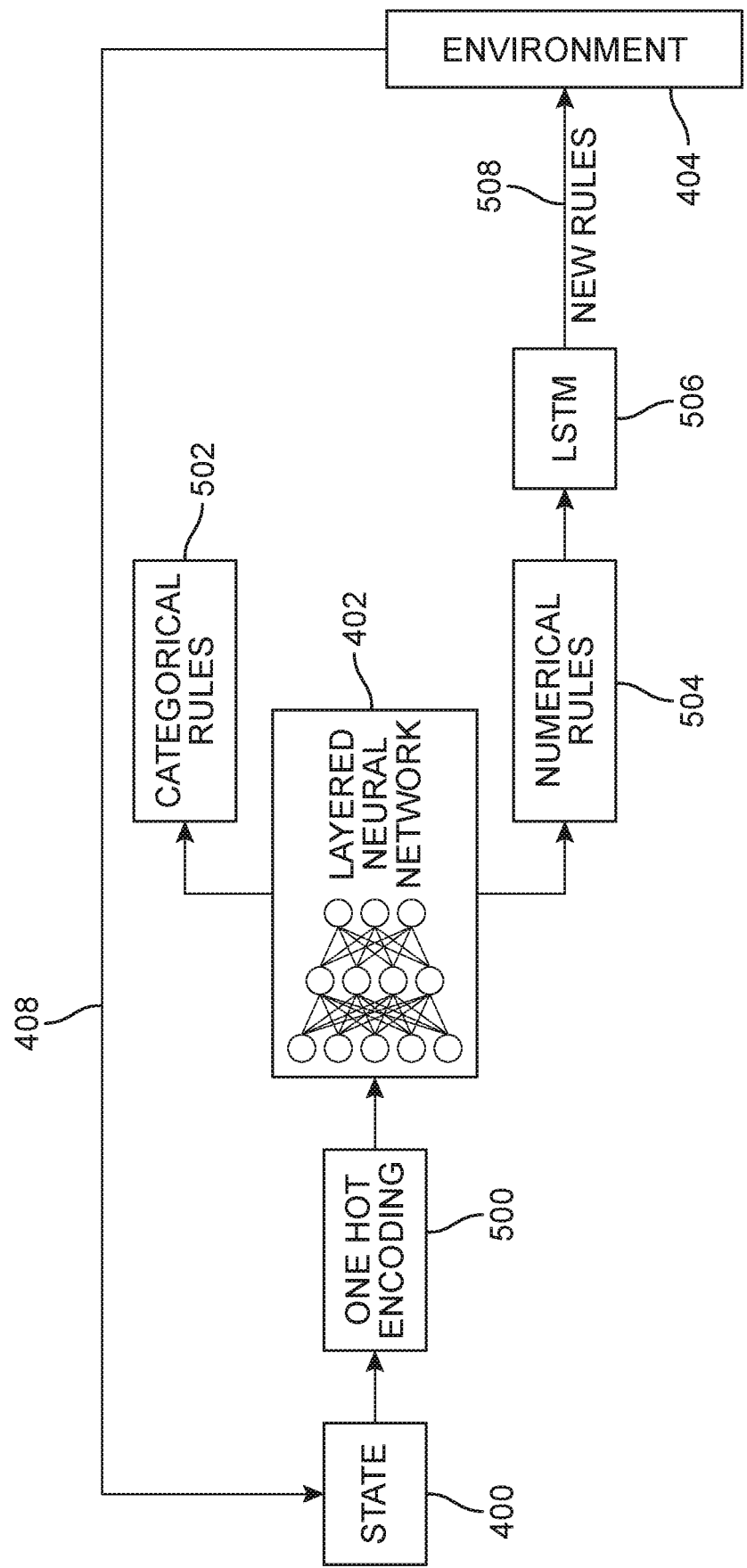
FIG. 5 is a schematic diagram of an example embodiment of a process of generating a prescriptive avoidance rule set.

FIG. 5 is a schematic diagram of an example embodiment of reinforcement learning phase 210 being used to refine rules for generating a prescriptive avoidance rule set. In some embodiments, reinforcement learning phase 210 may be used to refine different groups of rules, including categorical rules and numerical rules, which are used for the prescriptive avoidance rule set. Reinforcement learning phase 210 includes determining initial state 400 based on information obtained from historical incident alert data 110, as described above in reference to FIG. 4. In this embodiment, a one hot encoding module 500 may employ a process by which categorical variables are converted into a form that could be provided to machine-learning algorithms (e.g., neural network 402) to assist with prediction and refinement of the rules for the prescriptive avoidance rule set.

Next, after passing through one hot encoding module 500, neural network 402 is configured to determine whether a prospective rule is a categorical rule 502 or a numerical rule 504. Examples of categorical rules 502 include, but are not limited to: status of nodes, problems affecting the network, and other types of incidents that do not rely on numerical values to determine whether a problem is present. Examples of numerical rules 504 include, but are not limited to: threshold-based values for processing and/or memory usage, and other types of incidents that can be determined based on comparing a value to a predetermined value or limit. In one embodiment, the prescriptive avoidance rule set generated based on the completion of reinforcement learning phase 210 includes at least a first group of rules associated with categories associated with sources of incident alerts and a second group of rules associated with numerical values associated with incident alerts.

Additionally, in this embodiment, reinforcement learning phase 210 may include a long short-term memory (LSTM) module 506. LSTM module 506 is configured to classify, process, and make predictions based on time series data from numerical rules 504. Based on the output from neural network 402 and LSTM module 506, one or more new rules 508 may be generated for inclusion in the prescriptive avoidance rule set generated based on the completion of reinforcement learning phase 210. In some embodiments, new rules 508 may include modifying, adjusting, and/or changing one or more rules for environment 404 based on feedback received during reinforcement learning phase 210 (e.g., reward 408).

Figure 6:
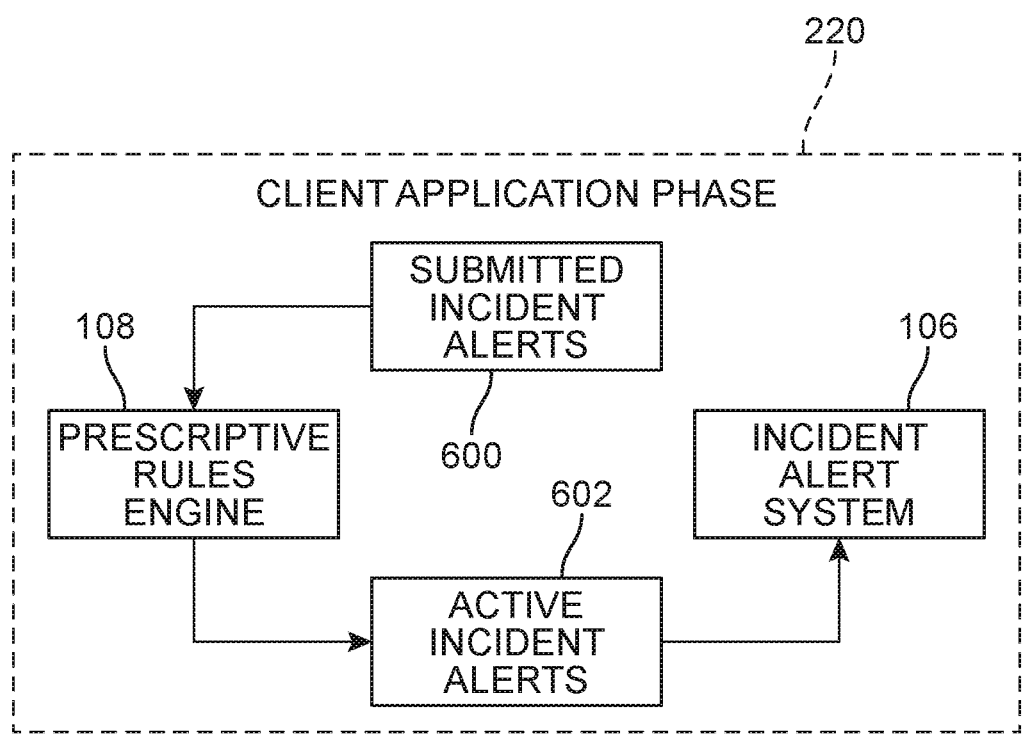
FIG. 6 is a schematic diagram of an example embodiment of a client application phase of a method for reducing incident alerts.

Referring now to FIG. 6, a schematic diagram of an example embodiment of client application phase 220 for reducing incident alerts is shown. As described above, upon completion of reinforcement learning phase 210, a prescriptive avoidance rule set may be generated for use by prescriptive rule engine 126 at incident avoidance system 120. In some embodiments, during client application phase 220, prescriptive rule engine 126 may be further tailored or customized for a particular enterprise environment by validating and/or modifying the rules included in the prescriptive avoidance rule set. For example, incident avoidance system 120 may generate prescriptive rule engine 108 that has been customized for the particulars of enterprise environment 100. In an example embodiment, customized prescriptive rule engine 108 may then be provided to enterprise environment 100 for use with incident alert system 106 to eliminate one or more dead-end tickets from a plurality of submitted incident alerts generated within enterprise environment 100.

As shown in FIG. 6, prescriptive rule engine 108 receives a plurality of submitted incident alerts 600 and applies the prescriptive avoidance rule set to eliminate one or more dead-end tickets. After passing through prescriptive rule engine 108, the remaining incident alerts may be identified as active incident alerts 602 for action by incident alert system 106. For example, if there are 100 incident alerts within submitted incident alerts 600, after passing through prescriptive rule engine 108, 80 incident alerts may be identified as active incident alerts 602 for action by incident alert system 106. That is, 20 incident alerts have been identified as dead-end tickets in this example and are removed or eliminated from active incident alerts 602 that are provided to incident alert system 106. With this arrangement, dead-end tickets that would otherwise take up time and resources from information technology incident alert system personnel, can be reduced or eliminated.

Figure 7:
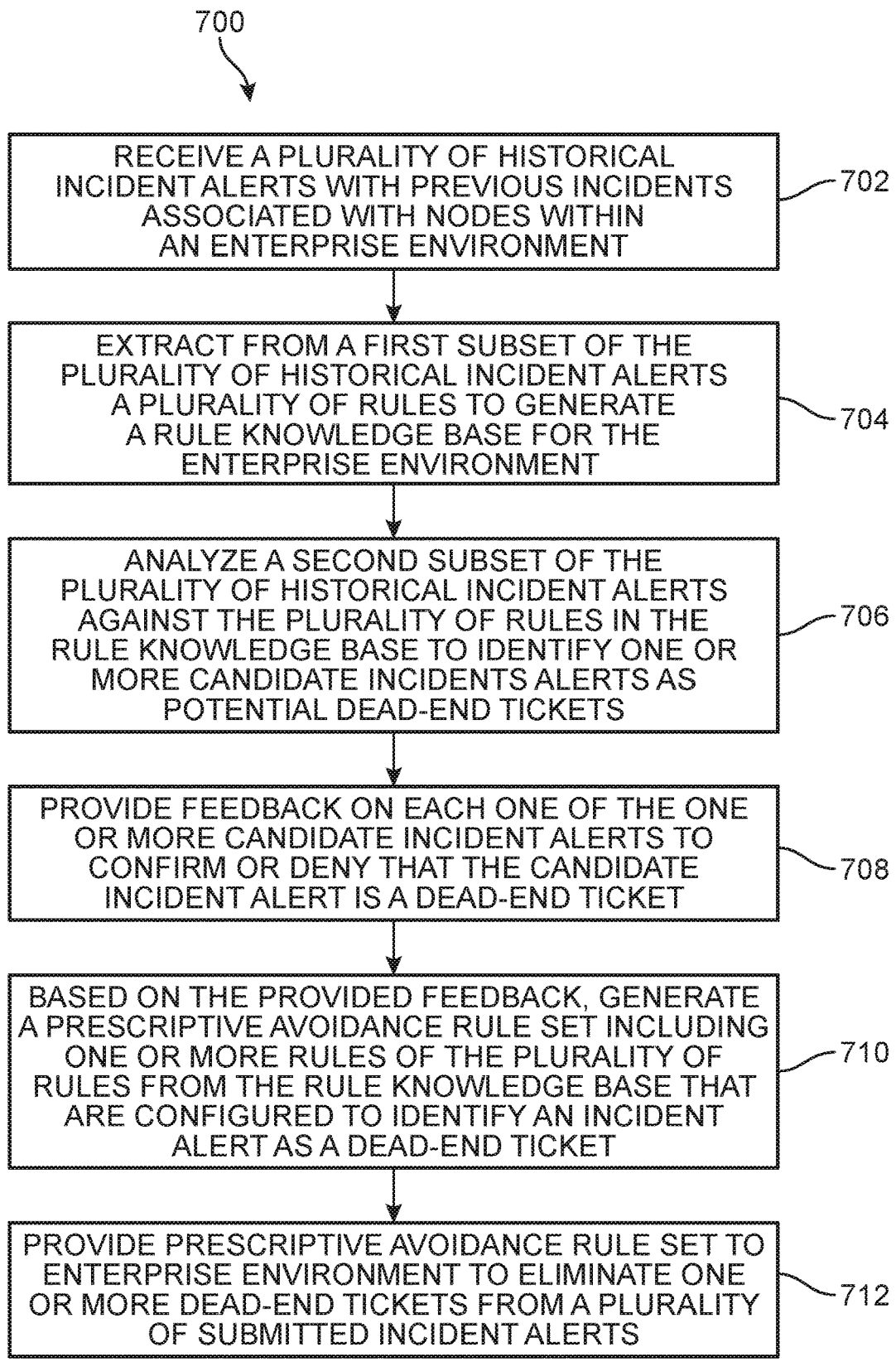
FIG. 7 is a flowchart illustrating a method for reducing incident alerts for an enterprise environment.

FIG. 7 is a flowchart illustrating a method 700 for reducing incident alerts for an enterprise environment according to an example embodiment. In some embodiments, method 700 may be implemented by an incident avoidance system, for example, incident avoidance system 120, described above. In this embodiment, method 700 begins with an operation 702. At operation 702, a plurality of historical incident alerts associated with previous incidents associated with nodes within an enterprise environment are received. For example, as shown in FIG. 1, incident avoidance system 120 receives historical incident alert data 110 associated with plurality of nodes 102 from enterprise environment 100.

Next, at an operation 704, method 700 includes extracting from a first subset of the plurality of historical incident alerts a plurality of rules to generate a rule knowledge base for the enterprise environment. In some embodiments, operation 704 may be part of training phase 200. For example, as described above, rule extractor 122 uses a portion of historical incident alert data 110 (e.g., approximately 70%) to extract and generate a plurality of rules for rules knowledge base 310. Operation 704 may include additional steps as part of training phase 200, including steps taken as part of training phase 200 described above and shown in reference to FIG. 3.

Upon completion of operation 704, method 700 further includes an operation 706 where a second subset of the plurality of historical incident alerts is analyzed against the plurality of rules in the rule knowledge base to identify one or more candidate incidents alerts as potential dead-end tickets. In some embodiments, operation 706 may be part of reinforcement learning phase 210. For example, as described above, reinforcement engine 124 uses a remaining portion of historical incident alert data 110 (e.g., approximately 30%) to refine and/or revise the plurality of rules in rules knowledge base 310.

Next, method 700 includes an operation 708 where feedback is provided on each of the one or more candidate incident alerts to confirm or deny that the candidate incident alert is a dead-end ticket. For example, positive and/or negative feedback may be provided regarding the rules as part of reinforcement learning phase 210 implemented as described above and shown in reference to FIGS. 4 and 5. Additionally, operations 706 and/or 708 may include additional steps as part of reinforcement learning phase 210, described above.

Based on the provided feedback from operation 708, method 700 further includes an operation 710 where a prescriptive avoidance rule set is generated. The prescriptive avoidance rule set includes one or more rules of the plurality of rules from the rule knowledge base 310 that are configured to identify an incident alert as a dead-end ticket. In an example embodiment, the prescriptive avoidance rule set may be included in prescriptive rule engine 126.

Upon generation of the prescriptive avoidance rule set at operation 710, method 700 further includes an operation 712 of providing the prescriptive avoidance rule set to the enterprise environment. The prescriptive avoidance rule set is configured to eliminate one or more dead-end tickets from a plurality of submitted incident alerts generated within the enterprise environment. For example, as described above in reference to FIG. 6, prescriptive rule engine 108 receives a plurality of submitted incident alerts 600 and applies the prescriptive avoidance rule set to eliminate one or more dead-end tickets. Additionally, prescriptive rule engine 126 generated by incident avoidance system 120 may be modified or customized, as described above, based on the particular configuration and requirements of enterprise environment 100 to provide prescriptive rule engine 108 for use by incident alert system 106 of enterprise environment 100.

Figure 8:
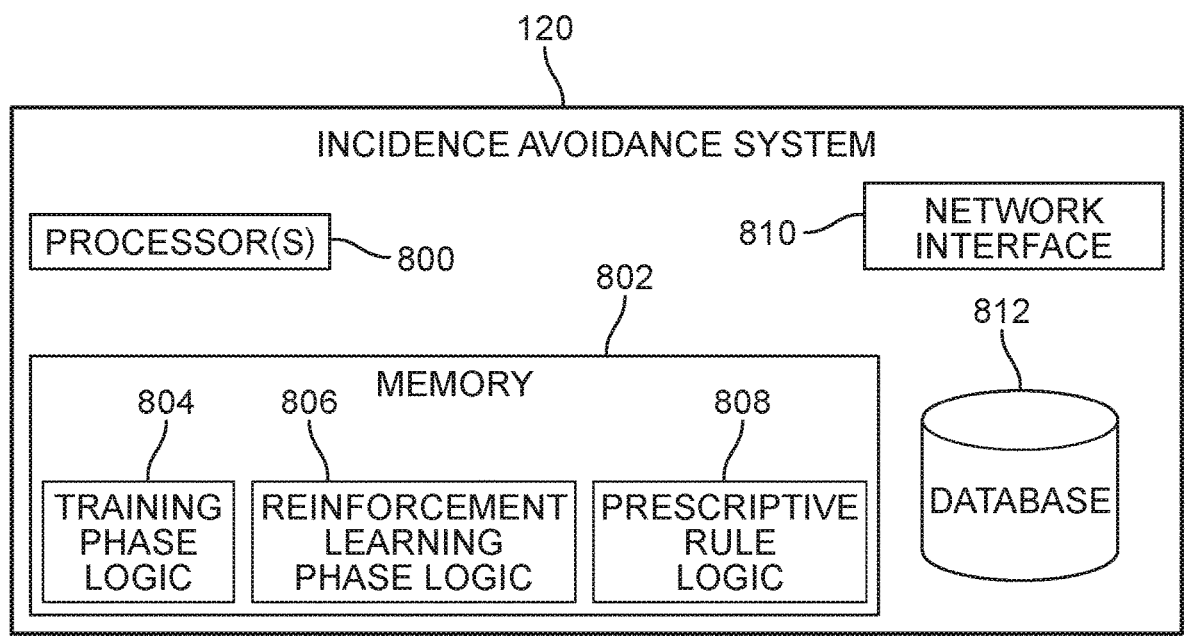
FIG. 8 is a block diagram of an example embodiment of an incident avoidance system.

FIG. 8 is a block diagram of an example embodiment of incident avoidance system 120. The various techniques according to the embodiments described herein may be implemented in hardware, software, or a combination thereof. In an example embodiment, incident avoidance system 120 is configured to perform the operations described above and depicted in connection with FIGS. 1-7. In this embodiment, incident avoidance system 120 includes one or more processors 800, memory 802, a network interface 810, and a database 812. Processor 800 may be a microprocessor or microcontroller configured to implement operations associated with functions of incident avoidance system 120.

Processor 800 executes instructions associated with software stored in memory 802. Specifically, memory 802 stores instructions for various control logic that, when executed by the processor 802, causes processor 800 to perform various operations on behalf of incident avoidance system 120 as described herein. In this embodiment, memory 802 includes at least a training phase logic 804, a reinforcement learning phase logic 806, and a prescriptive rule logic 808. Training phase logic 804 is configured to implement operations associated with training phase 200, described above. Reinforcement learning phase logic 806 is configured to implement operations associated with reinforcement learning phase 210. Prescriptive rule logic 808 is configured to implement operations associated with generating, modifying, and/or customizing the prescriptive avoidance rule set included in prescriptive rule engine 126 and/or prescriptive rule engine 108, as described above.

Memory 802 may include read only memory (ROM) of any type now known or hereinafter developed, random access memory (RAM) of any type now known or hereinafter developed, magnetic disk storage media devices, tamper-proof storage, optical storage media devices, flash memory devices, electrical, optical, or other physical/tangible memory storage devices. In general, memory 802 may comprise one or more tangible (non-transitory) computer readable storage media (e.g., a memory device) encoded with software comprising computer executable instructions and when the software is executed (by the processor 800) it is operable to perform operations described herein.

Network interface 810 facilitates network communications between incident avoidance system 120 and other computers and devices, including enterprise environment 100. Network interface 810 provides a two-way data communication coupling to a communication network, such a LAN or WAN. Additionally, database 812 of incident avoidance system 120 may be used to store data associated with any of the operations of incident avoidance system 120 described herein.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of reducing incident alerts for an enterprise environment, the method comprising:
   receiving a plurality of historical incident alerts associated with previous incidents associated with nodes within an enterprise environment, the plurality of historical incident alerts including a first portion and a second portion;
   extracting a plurality of rules from a first subset of the first portion of the plurality of historical incident alerts to generate a rule knowledge base for the enterprise environment;
   analyzing a second subset of the second portion of the plurality of historical incident alerts against the plurality of rules in the rule knowledge base to identify one or more candidate incidents alerts as potential dead-end tickets, wherein the second subset of the plurality of historical incident alerts is different from the first subset of the plurality of historical incident alerts;
   providing feedback on each of the one or more candidate incident alerts to confirm or deny that the candidate incident alert is a dead-end ticket;
   based on the provided feedback, generating a prescriptive avoidance rule set including one or more rules of the plurality of rules from the rule knowledge base that are configured to identify an incident alert as a dead-end ticket; and
   wherein the prescriptive avoidance rule set is configured to eliminate one or more dead-end tickets from a plurality of submitted incident alerts generated within the enterprise environment.

2. The method of claim 1, wherein extracting the plurality of rules further comprises:
   determining two or more communities of similar historical incident alerts that share a word frequency within a predetermined threshold.

3. The method of claim 2, further comprising:
   determining an affinity score for each incident alert of the first subset of the plurality of historical incident alerts with respect to each of the determined communities.

4. The method of claim 3, wherein determining the affinity score further comprises:
   determining a parent and child relationship between two or more nodes associated with incident alerts of the first subset of the plurality of historical incident alerts.

5. The method of claim 3, further comprising:
   based on the determined affinity scores, generating clusters of two or more communities.

6. The method of claim 4, further comprising:
   combining information associated with details of each incident alert of the first subset of the plurality of historical incident alerts into a cluster group database for each generated cluster.

7. The method of claim 1, wherein the prescriptive rule set includes at least a first group of rules associated with categories associated with sources of incident alerts and a second group of rules associated with numerical values associated with incident alerts.

8. A system for reducing incident alerts for an enterprise environment, the system comprising:
- at least one interface configured to receive data;
- a memory; and
- a processor in communication with the at least one interface and the memory, wherein the processor is configured to:
  - receive a plurality of historical incident alerts associated with previous incidents associated with nodes within an enterprise environment, the plurality of historical incident alerts including a first portion and a second portion;
  - extract a plurality of rules from a first subset of the first portion of the plurality of historical incident alerts to generate a rule knowledge base for the enterprise environment;
  - analyze a second subset of the second portion of the plurality of historical incident alerts against the plurality of rules in the rule knowledge base to identify one or more candidate incidents alerts as potential dead-end tickets, wherein the second subset of the plurality of historical incident alerts is different from the first subset of the plurality of historical incident alerts;
  - provide feedback on each of the one or more candidate incident alerts to confirm or deny that the candidate incident alert is a dead-end ticket;
  - based on the provided feedback, generate a prescriptive avoidance rule set including one or more rules of the plurality of rules from the rule knowledge base that are configured to identify an incident alert as a dead-end ticket; and
  - wherein the prescriptive avoidance rule set is configured to eliminate one or more dead-end tickets from a plurality of submitted incident alerts generated within the enterprise environment.

9. The system of claim 8, wherein extracting the plurality of rules by the processor includes determining two or more communities of similar historical incident alerts that share a word frequency within a predetermined threshold.

10. The system of claim 9, wherein the processor is further configured to:
- determine an affinity score for each incident alert of the first subset of the plurality of historical incident alerts with respect to each of the determined communities.

11. The system of claim 10, wherein determining the affinity score by the processor includes determining a parent and child relationship between two or more nodes associated with incident alerts of the first subset of the plurality of historical incident alerts.

12. The system of claim 10, wherein the processor is further configured to:
- generate clusters of two or more communities based on the determined affinity scores.

13. The system of claim 12, wherein the processor is further configured to combine information associated with details of each incident alert of the first subset of the plurality of historical incident alerts into a cluster group database for each generated cluster.

14. The system of claim 8, wherein the prescriptive rule set includes at least a first group of rules associated with categories associated with sources of incident alerts and a second group of rules associated with numerical values associated with incident alerts.

15. One or more non-transitory computer readable storage media encoded with instructions that, when executed by a processor of an incident alert reducing system, causes the processor to:
- receive a plurality of historical incident alerts associated with previous incidents associated with nodes within an enterprise environment, the plurality of historical incident alerts including a first portion and a second portion;
- extract a plurality of rules from a first subset of the first portion of the plurality of historical incident alerts to generate a rule knowledge base for the enterprise environment;
- analyze a second subset of the plurality of historical incident alerts against the plurality of rules in the rule knowledge base to identify one or more candidate incidents alerts as potential dead-end tickets, wherein the second subset of the plurality of historical incident alerts is different from the first subset of the plurality of historical incident alerts;
- provide feedback on each of the one or more candidate incident alerts to confirm or deny that the candidate incident alert is a dead-end ticket;
- based on the provided feedback, generate a prescriptive avoidance rule set including one or more rules of the plurality of rules from the rule knowledge base that are configured to identify an incident alert as a dead-end ticket; and
- wherein the prescriptive avoidance rule set is configured to eliminate one or more dead-end tickets from a plurality of submitted incident alerts generated within the enterprise environment.

16. The non-transitory computer readable storage media of claim 15, wherein the instructions for extracting the plurality of rules further causes the processor to:
- determine two or more communities of similar historical incident alerts that share a word frequency within a predetermined threshold.

17. The non-transitory computer readable storage media of claim 15, wherein the instructions further cause the processor to:
- determine an affinity score for each incident alert of the first subset of the plurality of historical incident alerts with respect to each of the determined communities.

18. The non-transitory computer readable storage media of claim 17, wherein the instructions for determining the affinity score further causes the processor to:
- determine a parent and child relationship between two or more nodes associated with incident alerts of the first subset of the plurality of historical incident alerts.

19. The non-transitory computer readable storage media of claim 17, wherein the instructions further cause the processor to:
- generate clusters of two or more communities based on the determined affinity scores; and
- combine information associated with details of each incident alert of the first subset of the plurality of historical incident alerts into a cluster group database for each generated cluster.

20. The non-transitory computer readable storage media of claim 15, wherein the prescriptive rule set includes at least a first group of rules associated with categories associated with sources of incident alerts and a second group of rules associated with numerical values associated with incident alerts.

* * * * *